(12) United States Patent
Gardner et al.

(10) Patent No.: US 9,792,375 B2
(45) Date of Patent: *Oct. 17, 2017

(54) COMPOSITE SEARCH RESULTS

(71) Applicant: PayPal, Inc., San Jose, CA (US)

(72) Inventors: Mark Joseph Gardner, Warrington, PA (US); Hugh Evan Williams, Los Gatos, CA (US); Valerie Nygaard, Saratoga, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,711

(22) Filed: Jun. 15, 2016

(65) Prior Publication Data
US 2016/0292286 A1    Oct. 6, 2016

Related U.S. Application Data

(63) Continuation of application No. 13/946,757, filed on Jul. 19, 2013, now Pat. No. 9,384,286.

(60) Provisional application No. 61/800,525, filed on Mar. 15, 2013.

(51) Int. Cl.
| | | |
|---|---|---|
| *G06F 17/30* | (2006.01) | |
| *G06Q 30/06* | (2012.01) | |
| *G06Q 30/08* | (2012.01) | |

(52) U.S. Cl.
CPC .. *G06F 17/30867* (2013.01); *G06F 17/30554* (2013.01); *G06Q 30/0623* (2013.01); *G06Q 30/08* (2013.01)

(58) Field of Classification Search
CPC .. G06F 17/30867; G06F 17/30; G06F 17/289; G06F 17/30861; G06F 17/30864; G06Q 30/0641; G06Q 40/04; G06Q 30/08; G06Q 30/0601; G06Q 30/0633; G06Q 30/0613; G06Q 30/06; G06Q 30/0631; G06Q 30/0623

See application file for complete search history.

(56) References Cited

U.S. PATENT DOCUMENTS

| | | |
|---|---|---|
| 6,415,270 B1 | 7/2002 | Rackson et al. |
| 6,591,261 B1 | 7/2003 | Arthurs |
| 6,704,716 B1 | 3/2004 | Force |
| 7,289,967 B1 | 10/2007 | Brader-Araje et al. |

(Continued)

OTHER PUBLICATIONS

"U.S. Appl. No. 13/946,757, Non Final Office Action mailed Jun. 4, 2015", 16 pgs.

(Continued)

*Primary Examiner* — Anh Ly
(74) *Attorney, Agent, or Firm* — Maschoff Brennan

(57) ABSTRACT

Systems and methods of providing composite search results are disclosed. A system may receive input via a user interface of a device accessing a first website, and determine item listing information of an item listed for sale on a second website based on the received input, with the second website being different from the first website. The system may cause the item listing information to be displayed on the first website on the device via the user interface, and enable the device to interact with the second website, via the user interface, regarding the item listed for sale by interacting with the item listing information being displayed on the first website.

16 Claims, 12 Drawing Sheets

(56) References Cited

U.S. PATENT DOCUMENTS

| | | | |
|---|---|---|---|
| 8,260,777 B1* | 9/2012 | Manber | G06F 17/30899 |
| | | | 705/14.1 |
| 8,751,516 B1 | 6/2014 | Wong et al. | |
| 9,384,286 B2 | 7/2016 | Gardner et al. | |
| 2002/0112028 A1 | 8/2002 | Colwill | |
| 2003/0220867 A1 | 11/2003 | Goodwin et al. | |
| 2005/0114229 A1 | 5/2005 | Ackley et al. | |
| 2005/0114273 A1 | 5/2005 | Ettinger, Jr. | |
| 2005/0131724 A1 | 6/2005 | Clay | |
| 2006/0100998 A1 | 5/2006 | Edwards et al. | |
| 2006/0173773 A1 | 8/2006 | Ettinger, Jr. | |
| 2006/0277167 A1 | 12/2006 | Gross et al. | |
| 2008/0021811 A1 | 1/2008 | Brader-Araje et al. | |
| 2008/0120129 A1 | 5/2008 | Seubert et al. | |
| 2008/0215416 A1* | 9/2008 | Ismalon | G06F 17/30867 |
| | | | 705/14.54 |
| 2008/0301562 A1 | 12/2008 | Berger et al. | |
| 2008/0306838 A1* | 12/2008 | Fleet | G06Q 30/0603 |
| | | | 705/26.81 |
| 2009/0119254 A1 | 5/2009 | Cross et al. | |
| 2010/0158315 A1 | 6/2010 | Martin | |
| 2010/0332339 A1* | 12/2010 | Patel | G06Q 20/3224 |
| | | | 705/26.1 |
| 2011/0307463 A1 | 12/2011 | Kasterstein et al. | |
| 2011/0320423 A1 | 12/2011 | Gemmell et al. | |
| 2012/0084177 A1* | 4/2012 | Tanaka | G06Q 30/0613 |
| | | | 705/26.41 |
| 2013/0006816 A1* | 1/2013 | Nuzzi | G06Q 30/0261 |
| | | | 705/27.1 |
| 2013/0054404 A1* | 2/2013 | Garcia | G06Q 30/0603 |
| | | | 705/26.3 |
| 2013/0290172 A1* | 10/2013 | Mashinsky | G06Q 20/12 |
| | | | 705/39 |
| 2014/0280007 A1 | 9/2014 | Gardner et al. | |
| 2016/0027096 A1* | 1/2016 | Li | G06Q 30/0635 |
| | | | 705/26.81 |

OTHER PUBLICATIONS

"U.S. Appl. No. 13/946,757, Notice of Allowance mailed Mar. 1, 2016", 10 pgs.

"U.S. Appl. No. 13/946,757, Response filed Dec. 4, 2015 to Non Final Office Action mailed Jun. 4, 2015", 16 pgs.

Azarias, Reda, et al., "Robit: An Extensible Auction-based Market Platform for Challenged Environments", Proceedings of the 4th ACM/1 EEE International Conference on Information and Communication Technologies and Development Article No. 39, (2010), 1-10.

Dawn, G Gregg, et al., "The relationship between website quality, trust and price premiums at online auctions", Article: Electronic Commerce Research, (Mar. 2010), 1-25.

* cited by examiner ent; and

COMPOSITE SEARCH RESULTS

CROSS-REFERENCE TO RELATED APPLICATIONS

This application is a continuation of U.S. patent application Ser. No. 13/946,757, filed on Jul. 19, 2013, now U.S. Pat. No. 9,384,286, issued Sep. 18, 2014, and entitled, "COMPOSITE SEARCH RESULTS", claims priority to U.S. Provisional Application No. 61/800,525, filed on Mar. 15, 2013, and entitled, "COMPOSITE SEARCH LISTING," which is hereby incorporated by reference in its entirety as set forth herein.

TECHNICAL FIELD

The present application relates generally to the technical field of data processing, and, in various embodiments, to systems and methods of providing composite search results that include search results from both general purpose search engines and specific purpose websites.

BACKGROUND

When using the Internet, users are often required to navigate from one website to another in order to pursue a topic or item of interest. However, such navigation from site to site can be time consuming, especially when using mobile devices. As a result, users may abandon their pursuits, leading to a loss of potential sales for e-commerce sites.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
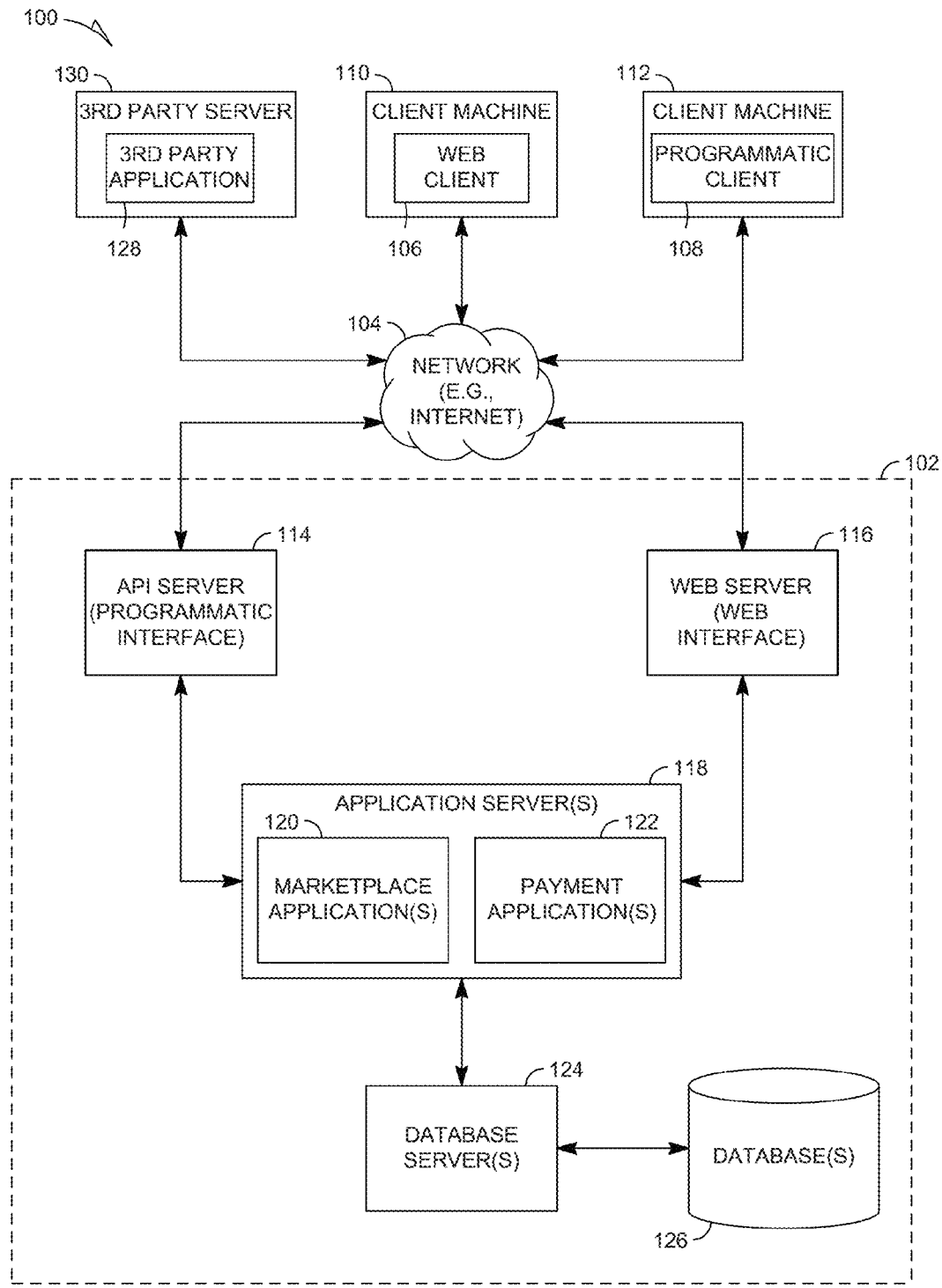
FIG. 1 is a block diagram depicting a network architecture of a system having a client-server architecture configured for exchanging data over a network, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Time-consuming navigation may be avoided by reducing the distance between a user's initial search query and the actual topics or items of interest. Enabling a user to interact with an e-commerce website regarding an item listing from a separate general purpose website increases the likelihood that the user will complete a transaction for the item listing, since the user does not need to navigate to the e-commerce website and wait for the e-commerce website to load.

In some embodiments, a system may comprise a machine, a search engine of a first website, and a composite search results module. The machine may have a memory and at least one processor. The search engine may be executable by the machine and configured to receive a search query from a user accessing the first website on a device, and to determine at least one search result based on the search query using the search engine. The search engine may be a general purpose search engine, and the search result(s) may comprise at least one general purpose search result that is based on a search of multiple websites other than the first website. The composite search results module may be executable by the machine and configured to determine item listing information of an item listed for sale on a second website based on the search query, where the second website is different from the first website, to cause the general purpose search result(s) and the item listing information to be displayed concurrently on the first website to the user on the device, and to enable the user to interact with the second website regarding the item listed for sale by interacting with the item listing information being displayed on the first website. In some embodiments, the general purpose search result(s) may be based on a search of all searchable websites on the World Wide Web.

In some embodiments, the composite search results module may be further configured to enable the user to initiate at least one transaction-based function for the item listed for sale. In some embodiments, the transaction-based function(s) may comprise at least one of submitting a request to purchase the item listed for sale, submitting a request to bid on the item listed for sale, and initiating a negotiation for the item listed for sale (e.g., submitting a best offer). In some embodiments, the composite search results module may also be configured to enable the user to initiate other functions for the item listed for sale (e.g., contacting the seller of item listed for sale to ask a question). In some embodiments, the composite search results module may be further configured to enable the user to initiate these function(s) using at least one functionally-active graphical user interface element displayed on the first website.

In some embodiments, the composite search results module may be further configured to retrieve transaction information for the item listed for sale from the second website. In some embodiments, the composite search results module may be further configured to use at least one remote application programming interface (API) of the second website in enabling the user to interact with the second website regarding the item listed for sale.

In some embodiments, a computer-implemented method may comprise receiving, by a search engine of a first website, a search query from a user accessing the first website on a device. At least one search result may be determined based on the search query using the search engine. The search engine may be a general purpose search engine, and the search result(s) may comprise at least one general-purpose search result that is based on a search of multiple websites other than the first website. Item listing information of an item listed for sale on a second website may be determined based on the search query. The second website may be different from the first website. The search result(s) and the item listing information may be caused to be displayed concurrently on the first website to the user on the device. The user may be enabled to interact with the second website regarding the item listed for sale by interacting with the item listing information being displayed on the first website. In some embodiments, the general purpose search result(s) may be based on a search of all searchable websites on the World Wide Web.

In some embodiments, enabling the user to interact with the second website regarding the item listed for sale may comprise enabling the user to initiate at least one transaction-based function for the item listed for sale. In some embodiments, the transaction-based function(s) may comprise at least one of submitting a request to purchase the item listed for sale, submitting a request to bid on the item listed for sale, and initiating a negotiation for the item listed for sale (e.g., submitting a best offer). In some embodiments, the composite search results module may also be configured to enable the user to initiate other functions for the item listed for sale (e.g., contacting the seller of item listed for sale to ask a question). In some embodiments, these function(s) may be initiated using at least one functionally-active graphical user interface element displayed on the first website.

In some embodiments, determining the item listing information may comprise retrieving transaction information for the item listed for sale from the second website. In some embodiments, enabling the user to interact with the second website regarding the item listed for sale may comprise using at least one remote application programming interface (API) of the second website.

In some embodiments, a non-transitory machine-readable storage device may store a set of instructions that, when executed by at least one processor, causes the at least one processor to perform the operations and method steps discussed within the present disclosure.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Washington State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
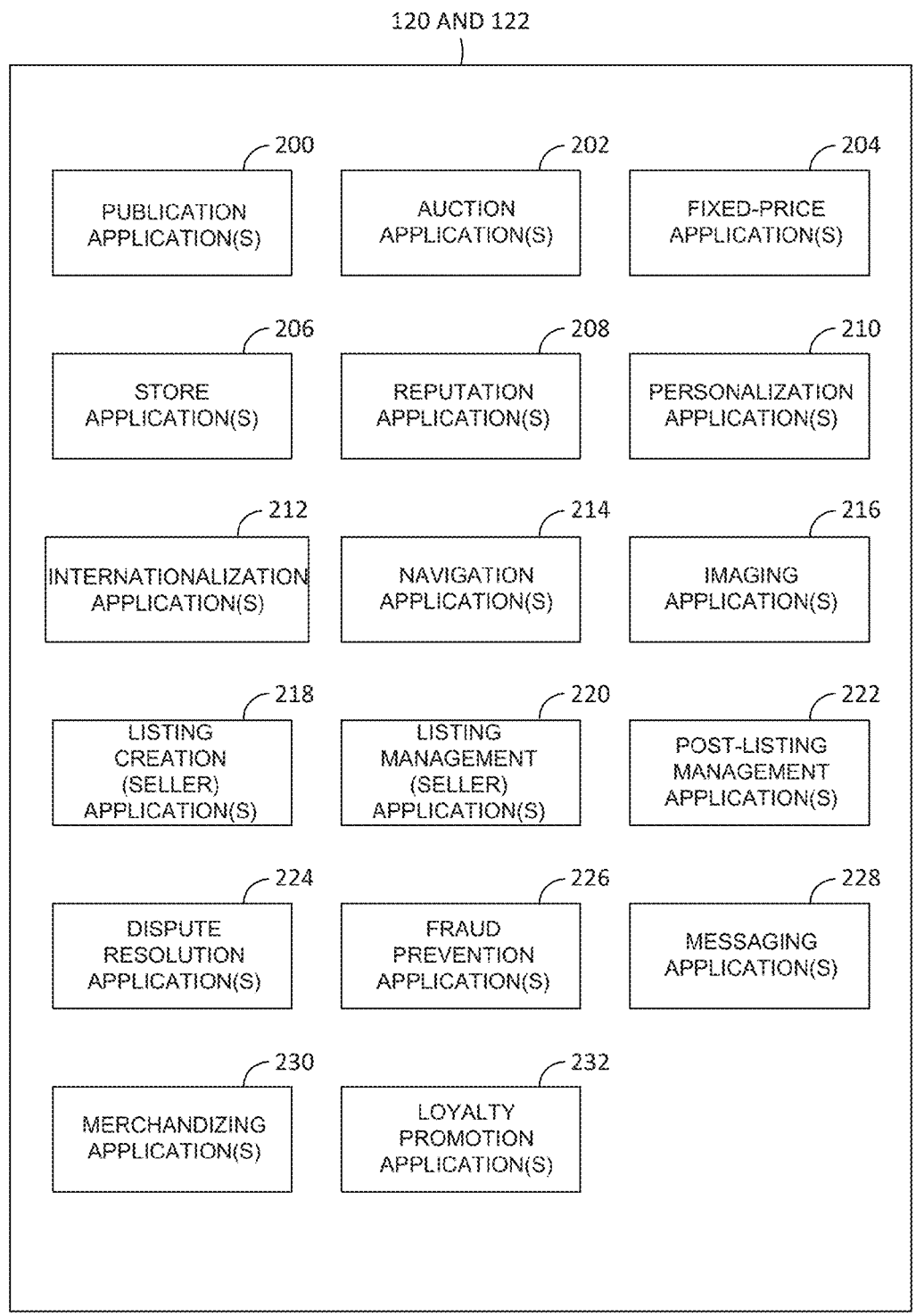
FIG. 2 is a block diagram depicting a various components of a network-based publisher, in accordance with some embodiments.

FIG. 2 is a block diagram illustrating multiple marketplace and payment applications 120 and 122 that, in one example embodiment, are provided as part of the networked system 102. Alternate solutions may include other combinations of these modules. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124. The slide checkout mechanism disclosed herein may be integrated with any or all of the applications described hereinbelow. Some examples of such integration are provided; however, other applications may also have integrations consistent with this disclosure.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller. The store applications 206 may support an online webstore, such as a hosted solution, where the webstore integrates with the slide checkout mechanism to enable users to easily use the webstore application on a mobile device, wherein the item and item identifier are provided by the store. According to some embodiments, the slide checkout cursor is configured according to input from the store, such as where the cursor is designed and presented to the user having the look and feel of the store. Further, the organization of the information presented to the user may be specific to the store.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties. The personalization application(s) 210 may integrate with the slide checkout mechanism such that the user's information is used to generate the selections and options available. In some embodiments, the user is able to specify their preferences, such as incorporate specific payment options, addresses and other considerations. For example, the user may specify that when a particular shipping address is selected, then a selection to identify the item as a gift will be presented on the display; when the user slides over the gift option, a gift receipt is provided with the item, or a gift card is provided with the item.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116. The internationalization applications 212 may integrate with the slide checkout mechanism to provide specific configurations for a geographical area. For example, in Japan, the display may provide the various selection items from right to left, consistent with the reading order for Japanese consumers.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
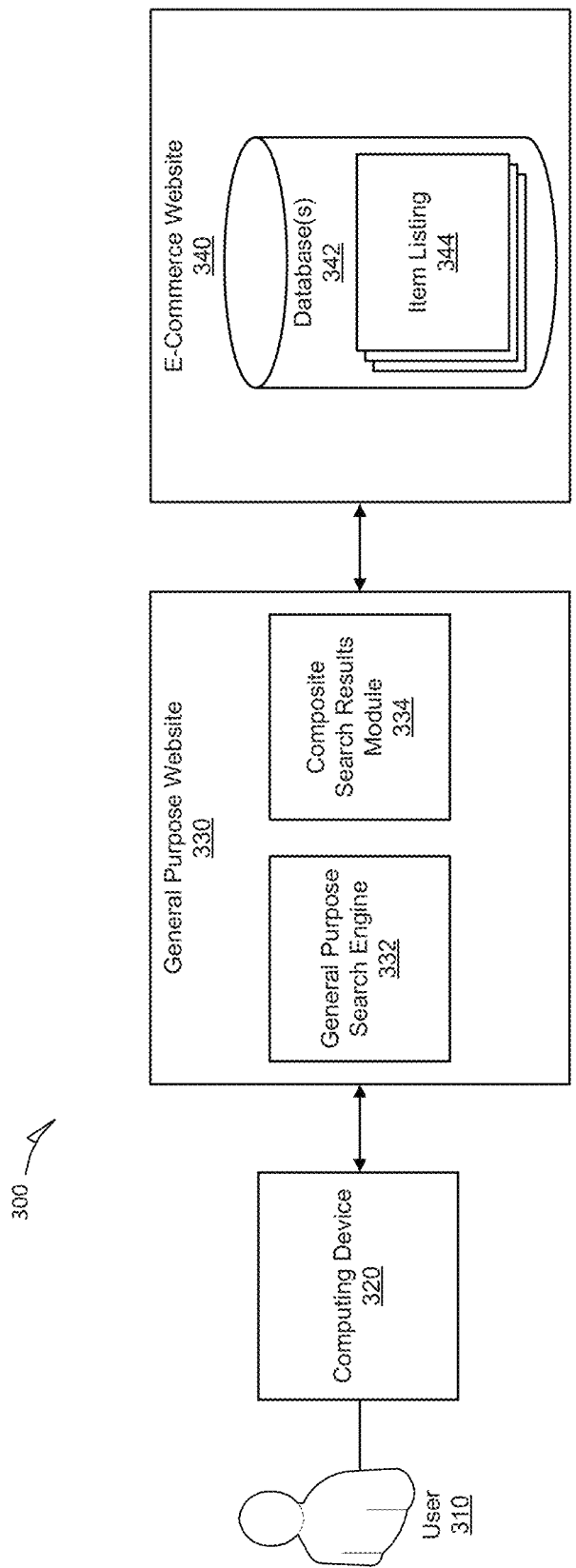
FIG. 3 is a block diagram depicting a composite search results system, in accordance with some embodiments.

FIG. 3 is a block diagram depicting a composite search results system 300, in accordance with some embodiments. In some embodiments, the composite search results system 300 may comprise a general purpose search engine 332 and a composite search results module 334. The general purpose search engine 332 and the composite search results module 334 may be part of a general purpose website 330 that is configured to perform a general purpose search via the general purpose search engine 332. In some embodiments, the general purpose search is a search of multiple websites other than the general purpose website 330. In some embodiments, the general purpose search is a search of all searchable websites on the World Wide Web. Examples of a general purpose search engine 332 include, but are not limited to, the web search engines used at http://www.google.com and http://www.yahoo.com. In some embodiments, a general purpose search engine 332 stands in contrast to a specific purpose search engine (not shown), which only searches the website on which it resides. Examples of specific purpose search engines include, but are not limited to, a search engine on an e-commerce website that only searches through its own content (e.g., searching for an item on http://www.ebay.com), without the search extending beyond that e-commerce website.

The general purpose search engine 332 may be configured to receive a search query from a user 310 accessing the general purpose website 330 on a computing device 320 (e.g., laptop, tablet computer, smartphone), and to determine at least one general purpose search result based on the search query using the general purpose search engine 332. For example, the user 310 may submit "Samsung Galaxy S4" as the search query. The general purpose search engine 332 may perform a general purpose search and return the general purpose search results, which may include links to tech blogs and websites discussing the launch of the Samsung Galaxy S4, as well as search results from a variety of other sources external to the general purpose website 330.

The composite search results module 334 may be configured to determine item listing information of item listings 344 of an e-commerce website 340, or some other type of website different from the general purpose website 330, based on the search query. These item listings 344 and their related information may be stored on one or more database(s) 342 of the e-commerce website 340. The composite search results module 334 may be configured to cause the general purpose search result(s) and the item listing information to be displayed concurrently on the general purpose website 330 to the user 310 on the device 320, and to enable the user 310 to interact with the e-commerce website 340 regarding the item listings 344 by interacting with the item listing information being displayed on the general purpose website 330.

In some embodiments, the composite search results module 334 may be further configured to enable the user 310 to initiate at least one transaction-based function for an item listing 344 of the e-commerce website 340 via the general purpose website 330 without the user 310 having to navigate to the e-commerce website 340. In some embodiments, the transaction-based function(s) may comprise at least one of submitting a request to purchase the item listed for sale, submitting a request to bid on the item listed for sale, and initiating a negotiation for the item listed for sale (e.g., submitting a best offer). Other transaction-based functions are also within the scope of the present disclosure. In some embodiments, the composite search results module 334 may be further configured to enable the user 310 to initiate the transaction-based function(s) using at least one functionally-active graphical user interface element displayed on the general purpose website 330.

In some embodiments, the composite search results module 334 may be further configured to retrieve transaction information for the item listing 344 from the e-commerce website 340. In some embodiments, the composite search results module 334 may be further configured to use at least one remote application programming interface (API) of the e-commerce website 340 in enabling the user to interact with the e-commerce website 340 regarding the item listing 344. The general purpose website 330 may use the remote API's of the e-commerce website 340 to pull information about item listings 344 based on the search query and present that information to the user 310 on the general purpose website 330 without the user 310 ever having to navigate to and load the e-commerce website 340.

The composite search results module 334 may present the general purpose search results along with information about one or more item listings 344 (e.g., an item listing from eBay for the Samsung Galaxy S4) to the user 310 on the general purpose website 330. In some embodiments, the information about the item listings 344 presented to the user 310 on the general purpose website 330 may comprise transactional information and may be transactionally functional. For example, the user 310 may view the item listing and perform transactional functions (e.g., select a bid on or buy option) for the corresponding item on the general purpose website 330 without having to click-through or otherwise navigate to the e-commerce website 340. In some embodiments, the user 310 may perform all of the transactional functions (e.g., all the way through completing the purchase of the item) directly from the general purpose website 330 without having to go to the e-commerce website 340. In some embodiments, the user 310 may perform the initial transactional function (selecting a bid or buy button) or some of the transactional functions directly from the general purpose website 330 without having to go to the e-commerce website 340. In this respect, the functionality of the e-commerce website 340 is being brought forward in the navigation process to the user at the general purpose website 330 in order to increase the likelihood that the user 310 will complete a transaction.

Figure 4:
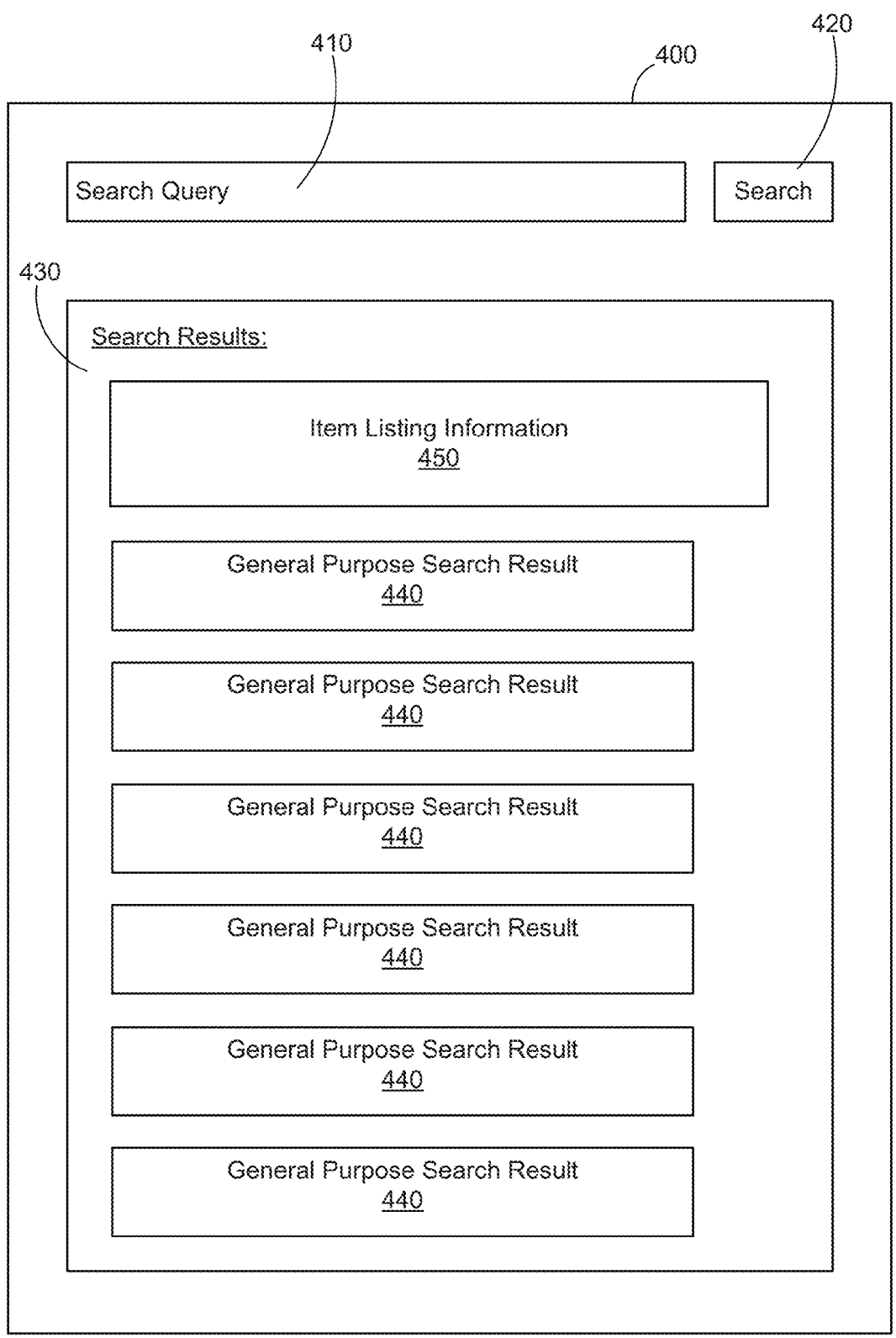
FIG. 4 illustrates a graphical user interface displaying composite search results, in accordance with some embodiments.

FIG. 4 illustrates a graphical user interface 400 displaying composite search results, in accordance with some embodiments. The composite search results comprise general purpose search results 440, as well as item listing information 450, and may be presented on a general purpose website 320 having a general purpose search engine 332. In FIG. 4, a user 310 may enter a search query in a search field 410 and select the "Search" button 420, or the like, in order to submit the search query for processing. In response, the general purpose search engine 320 may perform a general purpose search (e.g., a Web-wide search) and return search results 440 resulting from this general purpose search. Such results may include, but are not limited to, links to web pages, titles, descriptions, and images.

Additionally, item listing information 450 from an e-commerce website 340 may be retrieved based on the search query, and then presented concurrently with the general purpose search results 440. As previously discussed, in some embodiments, the item listing information 450 may comprise functionality that enables the user 310 to interact with an e-commerce site 340 from which the item listing information 450 belongs. In some embodiments, the composite search results module 334 may reach into the live item/product listings of the e-commerce website 340 through remote API's of the e-commerce website 340.

Figure 5:
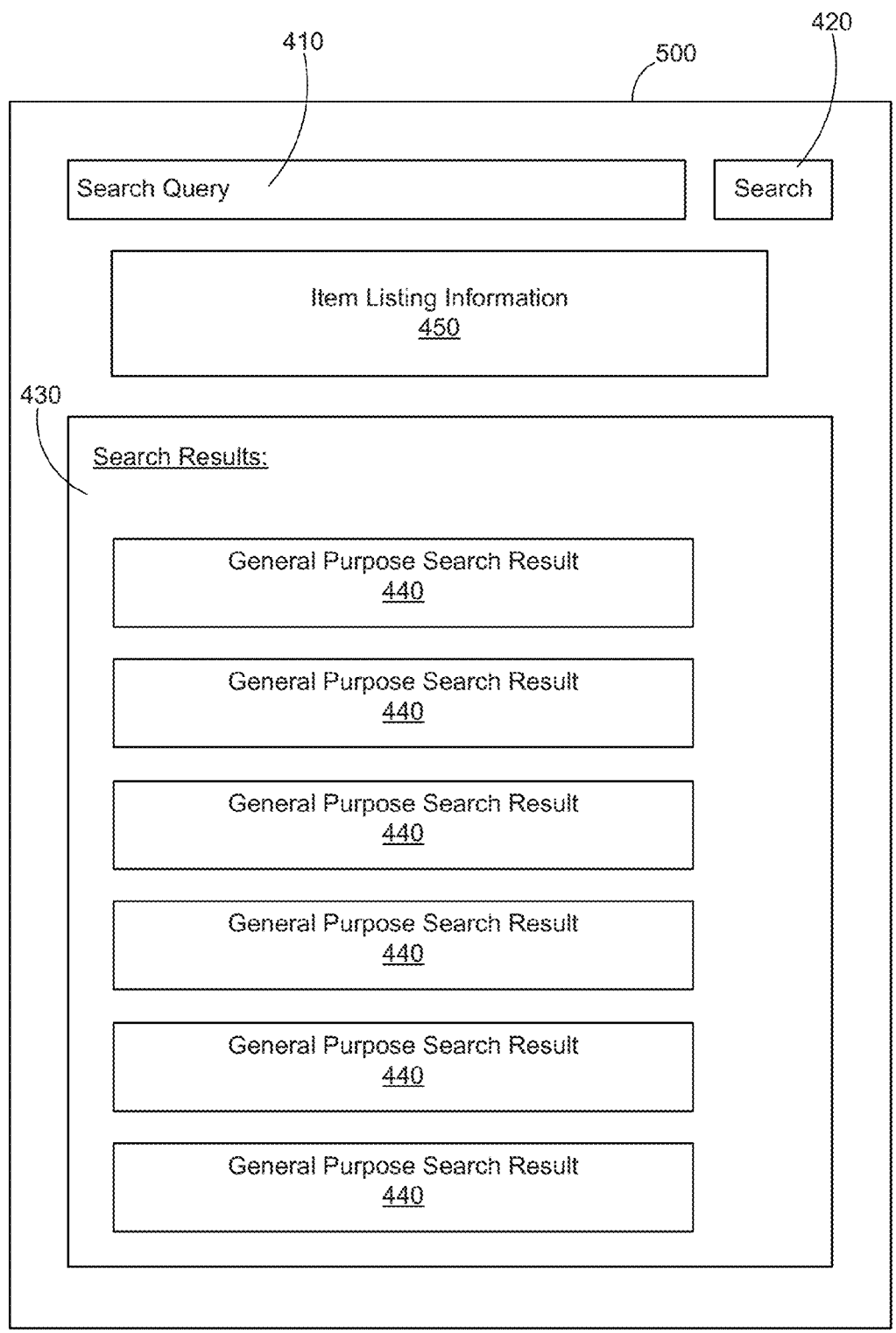
FIG. 5 illustrates a graphical user interface displaying composite search results, in accordance with some embodiments.

In some embodiments, the item listing information 450 may be presented in the same search result section 430 as the general purpose search results 440. However, it is contemplated that the item listing information 450 may additionally or alternatively be presented in a separate section as the general purpose search results 440. FIG. 5 illustrates a graphical user interface 500 displaying composite search results, where the item listing information 450 is presented between the search field 410 and the search results section 430 for the general purpose search results 440. It is contemplated that other display configurations of the general purpose search results 440 and the item listing information 450 are also within the scope of the present disclosure.

Although reference is made herein to the use of a general purpose website 330, a general purpose search engine 332, and general purpose search results 440, it is contemplated that these elements may be replaced with a specific purpose website (e.g., an e-commerce or social media website), a specific purpose search engine, and specific purpose search results (e.g., results obtained only from the specific purpose website, such as the website's own item listings), respectively, in accordance with some embodiments of the present disclosure. Accordingly, in such embodiments, the specific purpose search results may be presented to the user 310 on the specific purpose website along with the item listing information 450 from another website.

Figure 6A:
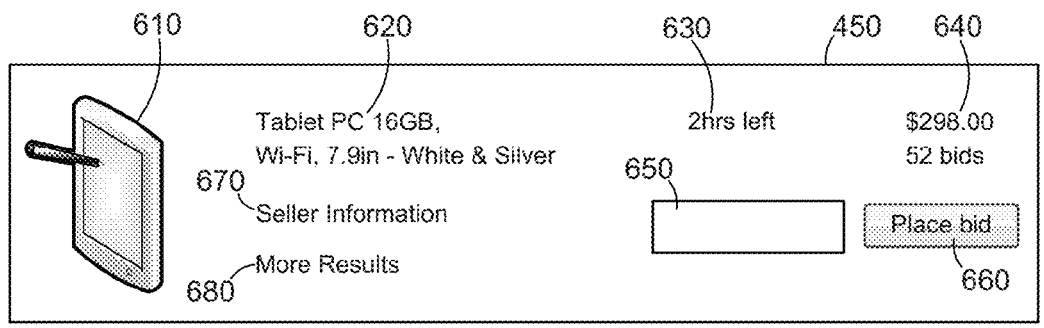
FIGS. 6A-6C illustrate item listing information to be displayed as part of composite search results, in accordance with some embodiments.
Figure 6B:
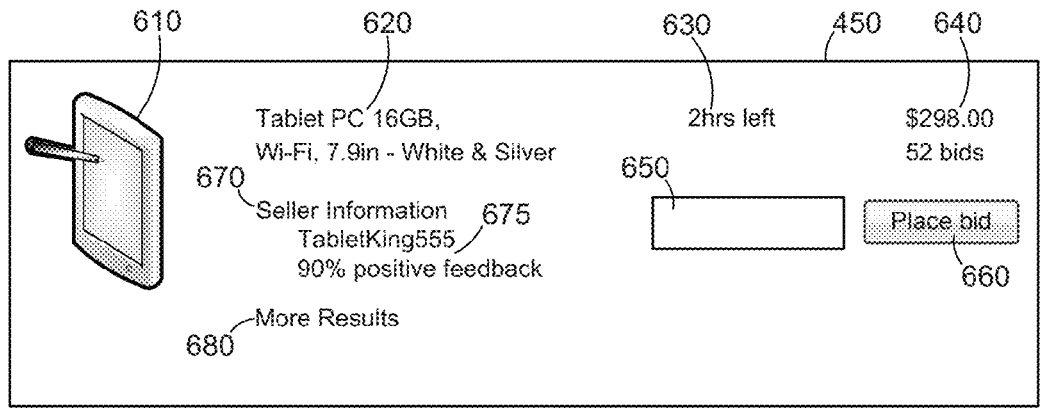
Figure 6C:
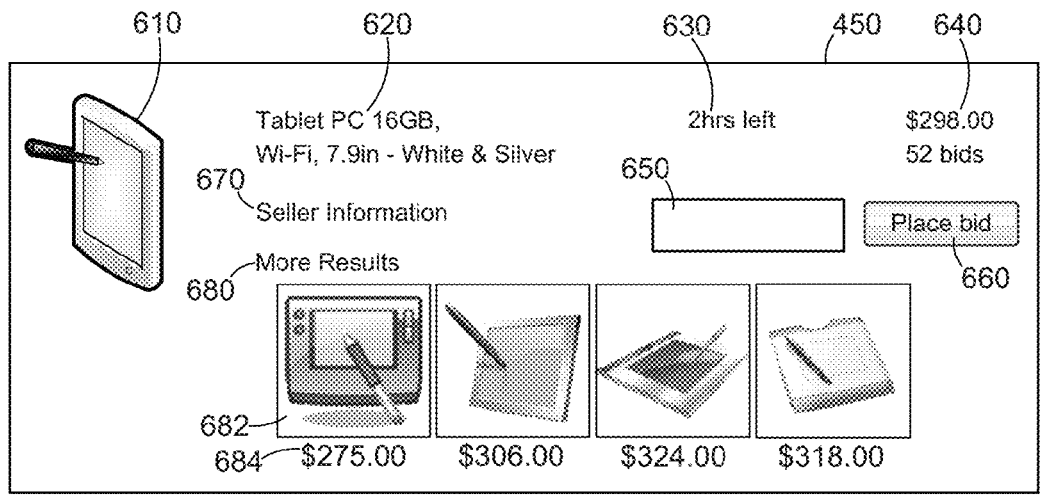

FIGS. 6A-6C illustrate item listing information 450 to be displayed as part of composite search results, in accordance with some embodiments. For simplification and ease in viewing, examples of information that may be displayed as part of the item listing information 450 are provided on their own, separate from the composite search results in FIGS. 4 and 5. However, it is contemplated that the details of the item listing information 450 in FIGS. 6A-6C may be applied to the item listing information 450 in FIGS. 4 and 5.

In FIG. 6A, the item listing information 450 may comprise an image 610 of an item for sale on an e-commerce website 340, as well as identifying and/or descriptive information 620 of the item. In some embodiments, the item may be offered for auction. Accordingly, the item listing information 450 may comprise auction-related information, including, but not limited to, remaining time 530 for the auctioning of the item and bid information 640 (e.g., current bid, number of bids) for the item. The item listing information 450 may also comprise user interface elements to enable the user to perform transaction-related functions for the item. For example, the item listing information 450 may comprise a user input field 650 for the user 310 to provide a bid amount, as well as a selectable "Place bid" button 660 to enable the user 310 to submit the provided bid amount to the e-commerce website 340. It is contemplated that other transaction-related functions and user interface elements to perform those functions are also within the scope of the present disclosure.

The item listing information 450 may also comprise a selectable "Seller Information" user interface element 670 to enable the user to find out information about the seller of the item. For example, as seen in FIG. 6B, the user 310 may click on the "Seller Information" user interface element 770 and be presented with seller information 675 (e.g., seller ID and feedback rating). The seller information 675 may be retrieved from the e-commerce website 340 without the user 310 having to navigate to the e-commerce website 340.

The item listing information 450 may also comprise a selectable "More Results" user interface element 680 to enable the user 310 to see more item listings that are based on the search query submitted by the user 310 to the general purpose search engine 332 or that are related to the current item being presented to the user 310. For example, as seen in FIG. 6C, the user 310 may click on the "More Results" user interface element 680 and be presented with additional item listing information, which may include images 682 of additional items and their corresponding prices 684 (e.g., current bid price). The additional item listing information may be retrieved from the e-commerce website 340 without the user 310 having to navigate to the e-commerce website 340.

It is contemplated that other types of item listing information 450 are also within the scope of the present disclosure. Such information may be retrieved from the e-commerce website 340 and presented to the user 310 along with general purpose search results without the user 310 having to navigate to the e-commerce website 340.

Figure 7:
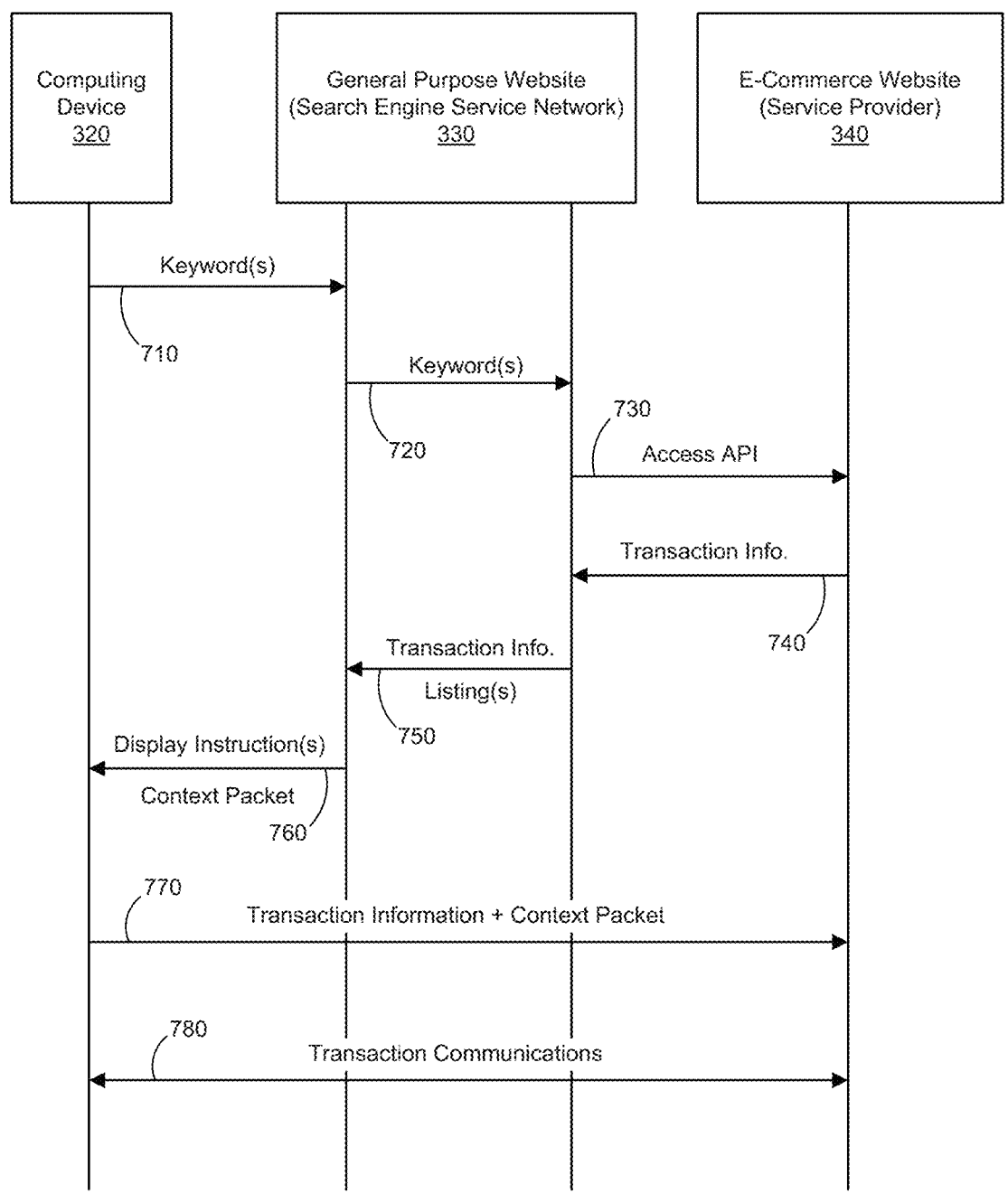
FIG. 7 illustrates communication between components of a system for providing composite search results, in accordance with some embodiments.

FIG. 7 illustrates communication between components of a system for providing composite search results, in accordance with some embodiments. At 710, a user 310 may use a computing device 320 to submit one or more keywords to a general purpose search engine 332 of a general purpose website 330 (e.g., a search engine service network). At 720, the general purpose search engine 332 may provide the keyword(s) to its index module to determine the corresponding item listing(s) of an e-commerce website 340 (or some other service provider). In some embodiments, the index module may be part of the composite search results module 334. At 730, the composite search results module 334 may then access one or more API's of the e-commerce website 340 to obtain transaction-related information for the item listing(s) at 740. At 750, the index module may then provide the retrieved transaction-related information, along with the item listing(s), to the general purpose search engine 332. At 760, the general purpose search engine 332 may then cause the item listing, including the transaction-related information, to be displayed on the computing device 320 via one or more display instructions and a context packet. At 770, the user 310 may then provide, via the computing device 320, transaction-related information (e.g., buy/bid commands, billing information, etc.) and a context packet to the e-commerce website 340 through the general purpose website 330 or directly to the e-commerce website 340 without using the general purpose website 330. At 780, the computing device 320 and the e-commerce website 780 may communicate with each other in order to complete a transaction related to the item listing(s). It is contemplated that other embodiments of communication between components of a system for providing composite search results may also be employed and are within the scope of the present disclosure.

Figure 8:
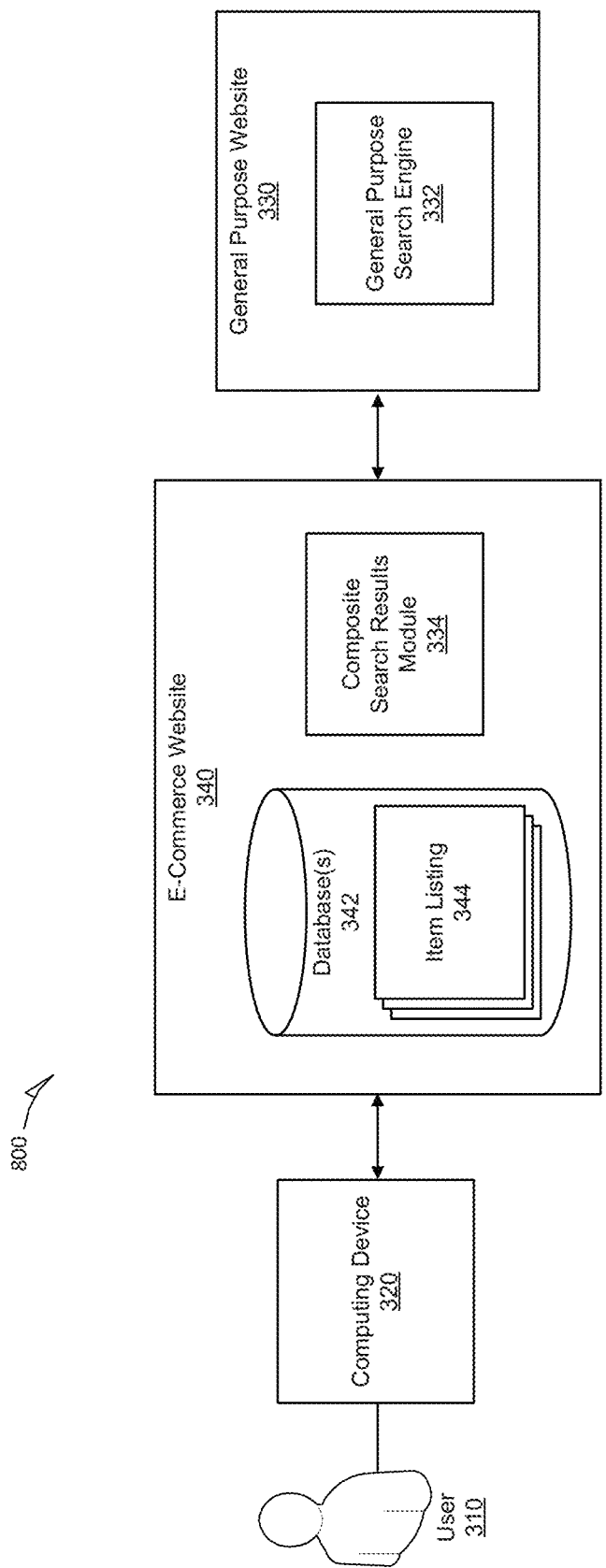
FIG. 8 is a block diagram illustrating a composite search results system, in accordance with some embodiments.

FIG. 8 is a block diagram illustrating a composite search results system 800, in accordance with some embodiments. In some embodiments, the composite search listings (i.e., the general purpose search results combined with the item listing(s)) may be presented on the e-commerce website 640 in addition to or as an alternative to being presented on the general purpose website 630. For example, in FIG. 8, the user 310 may submit a search query on the e-commerce website 340, which may pull general purpose search results from the general purpose website 330, and present those pulled general purpose search results to the user 310 along with the specific purpose search results (e.g., item listings from the specific purpose website 340) without the user 310 going to the general purpose website 330. In this scenario, the e-commerce website 340 may use remote API's of the general purpose website 330 to obtain the general purpose search results.

Figure 9:
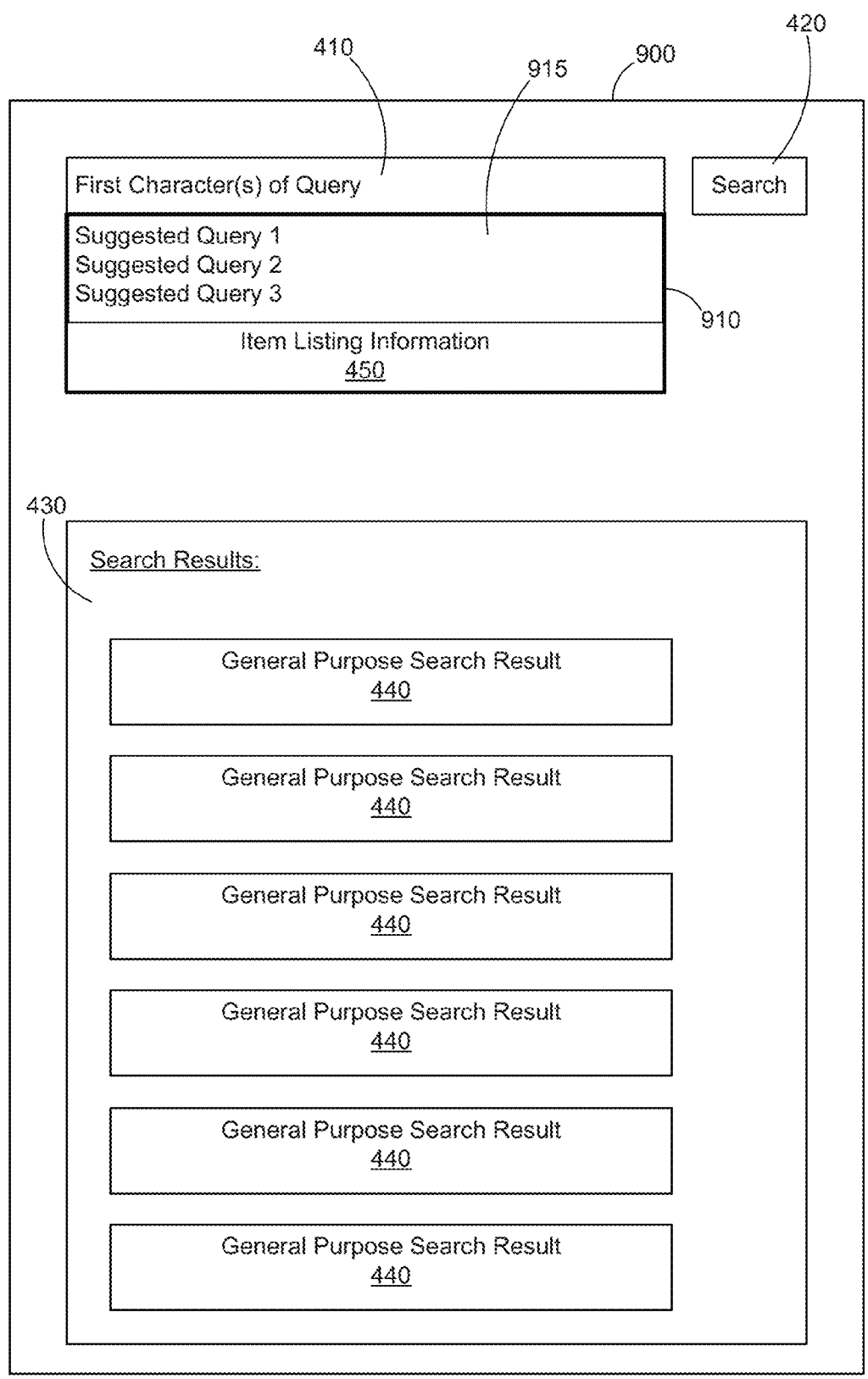
FIG. 9 illustrates a graphical user interface displaying composite search results, in accordance with some embodiments.

In some embodiments, item listing information 450 and general purpose search results 440 may be presented to the user 310 before the user 310 is finished entering the entire search query. FIG. 9 illustrates a graphical user interface 900 displaying composite search results, in accordance with some embodiments, where item listing information and general purpose search results 440 are provided to the user 310 before the user 310 is finished entering the entire search query. When the user 310 is typing a keyword into the search field 410, as the user 310 is entering the characters of the keyword, suggested query terms 915 may be provided in an auto-fill or auto-complete box 910.

The general purpose search engine 332 may perform multiple operations behind the scenes in the background to understand what the user intent is in order to personalize the experience for the user 310. For example, when attempting to enter the keyword "Samsonite", even though the user 310 may have only entered "sam", the general purpose search engine 332 may determine that the user 310 is looking for bags, so it may provide "Samsonite" higher in the auto-fill box 910 than "Samsung".

In some embodiments, the general purpose search engine 332 may use a suggested query 915 for real-time retrieval of item listing information 450, which may then be presented to the user 310 in the auto-fill box 910 before the user 310 has even completed entering and submitting the keyword for search. The general purpose search engine 330 may use user history, brand preferences, immediate context (e.g., user searching for travel items), as well as other signals, to predict the keyword. In the example above, as soon as the user starts typing "sam", the general purpose search engine 330 may be able to predict the keyword and use it to retrieve item listing information 450.

In some embodiments, item listing information 450 presented in the auto-fill box 910 may have transactional functionality, as previously discussed. In some embodiments, the composite search results module 334 may use remote API's to obtain the item listing information 450 for the auto-fill box 910. The general purpose search engine 332 may take the predicted keyword, package it, and search for it on another website site (e.g., the e-commerce website 340) using one or more remote API's of the other website.

Figure 10:
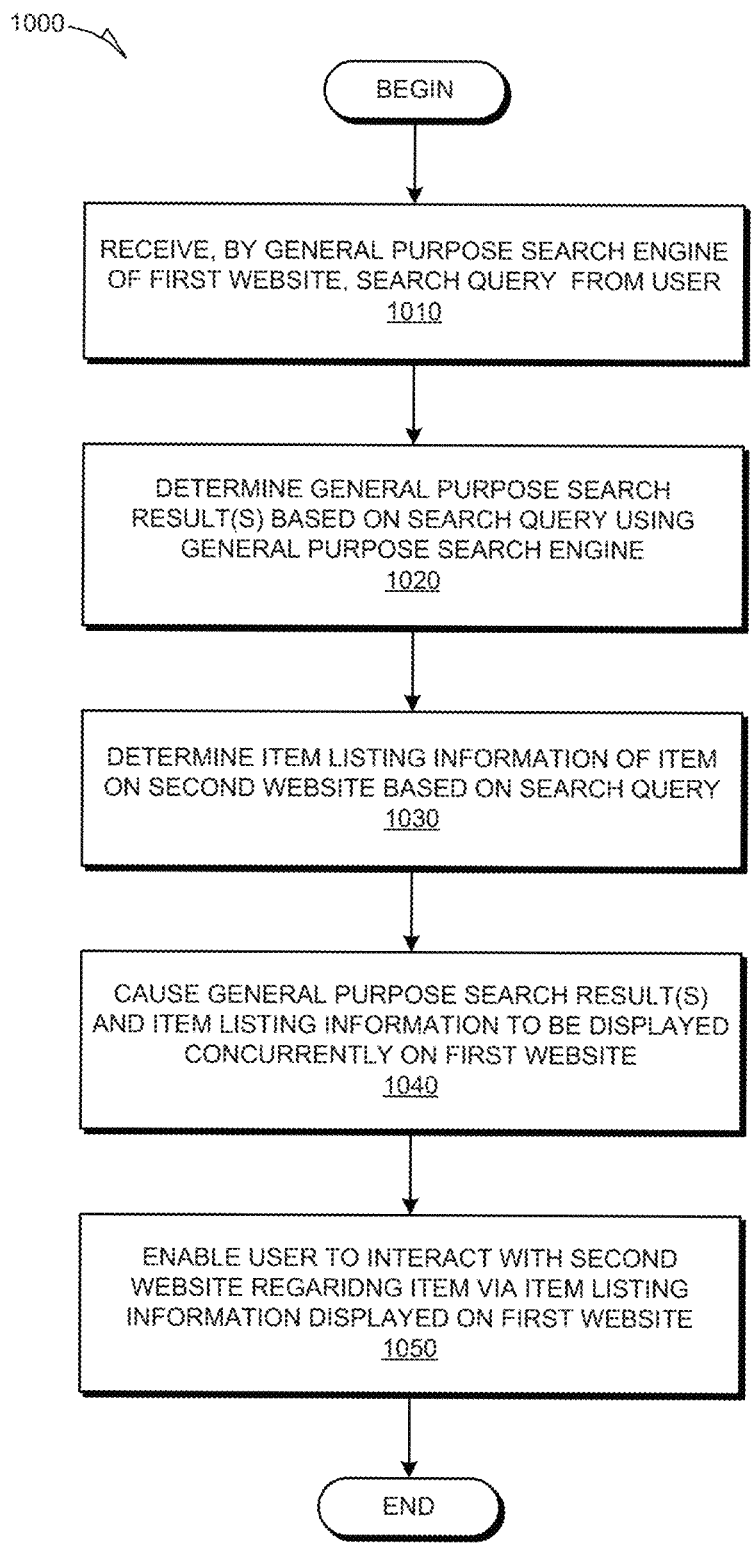
FIG. 10 is a flowchart illustrating a method of providing composite search results, in accordance with an example embodiment.

FIG. 10 is a flowchart illustrating a method 1000 of providing composite search results, in accordance with an example embodiment. It is contemplated that the operations of method 1000 may be performed by a system or modules of a system (e.g., composite search results system 300 in FIG. 3). At operation 1010, a general purpose search engine 332 of a first website may receive a search query from a user 310 accessing the first website on a device. At operation 1020, at least one general purpose search result 440 may be determined based on the search query using the general purpose search engine 332. The general-purpose search result(s) 440 may be based on a search of multiple websites other than the first website. At operation 1030, item listing information 450 of an item listed for sale on a second website may be determined based on the search query. The second website may be different from the first website. At operation 1040, the general purpose search result(s) 440 and the item listing information 450 may be caused to be displayed concurrently on the first website to the user 310 on the device 320. At operation 1050, the user 310 may be enabled to interact with the second website regarding the item listed for sale by interacting with the item listing information 450 being displayed on the first website. In some embodiments, the general purpose search result(s) 440 may be based on a search of all searchable websites on the World Wide Web. It is contemplated that any of the other features described within the present disclosure may be incorporated into method 1000.

Figure 11:
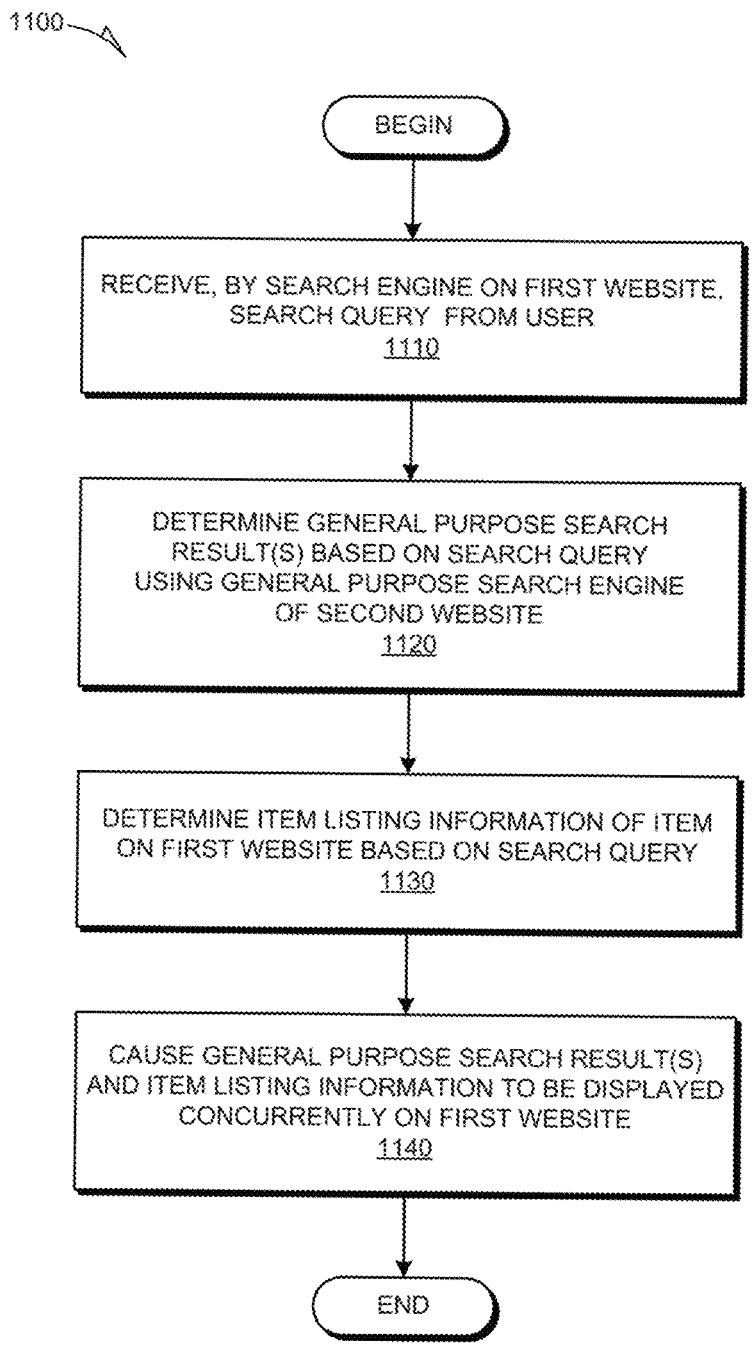
FIG. 11 is a flowchart illustrating a method of providing composite search results, in accordance with an example embodiment.

FIG. 11 is a flowchart illustrating a method 1100 of providing composite search results, in accordance with an example embodiment. It is contemplated that the operations of method 1100 may be performed by a system or modules of a system (e.g., composite search results system 800 in FIG. 8). At operation 1110, a search query from a user 310 may be received by a search engine on a first website. At operation 1120, at least one general purpose search result 440 may be determined based on the search query using a general purpose search engine 332 of a second website. In some embodiments, the general purpose search result(s) 440 may be based on a search of all searchable websites on the World Wide Web. At operation 1130, item listing information 450 of an item for sale on the first website may be determined based on the search query. At operation 1140, the general purpose search result(s) 440 and the item listing information 450 may be caused to be displayed concurrently on the first website to the user 310 on the device. It is contemplated that any of the other features described within the present disclosure may be incorporated into method 1100.

As previously mentioned, although reference is made herein to the use of a general purpose website 330, a general purpose search engine 332, and general purpose search results 440, it is contemplated that these elements may be replaced with a specific purpose website (e.g., an e-commerce or social media website), a specific purpose search engine, and specific purpose search results (e.g., results obtained only from the specific purpose website, such as the website's own item listings), respectively, in accordance with some embodiments of the present disclosure. Accordingly, in such embodiments, the specific purpose search results may be presented to the user 310 on the specific purpose website along with the item listing information 450 from another website.

It is contemplated that any of the features and/or embodiments discussed herein may be combined or incorporated into any of the other features and/or embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
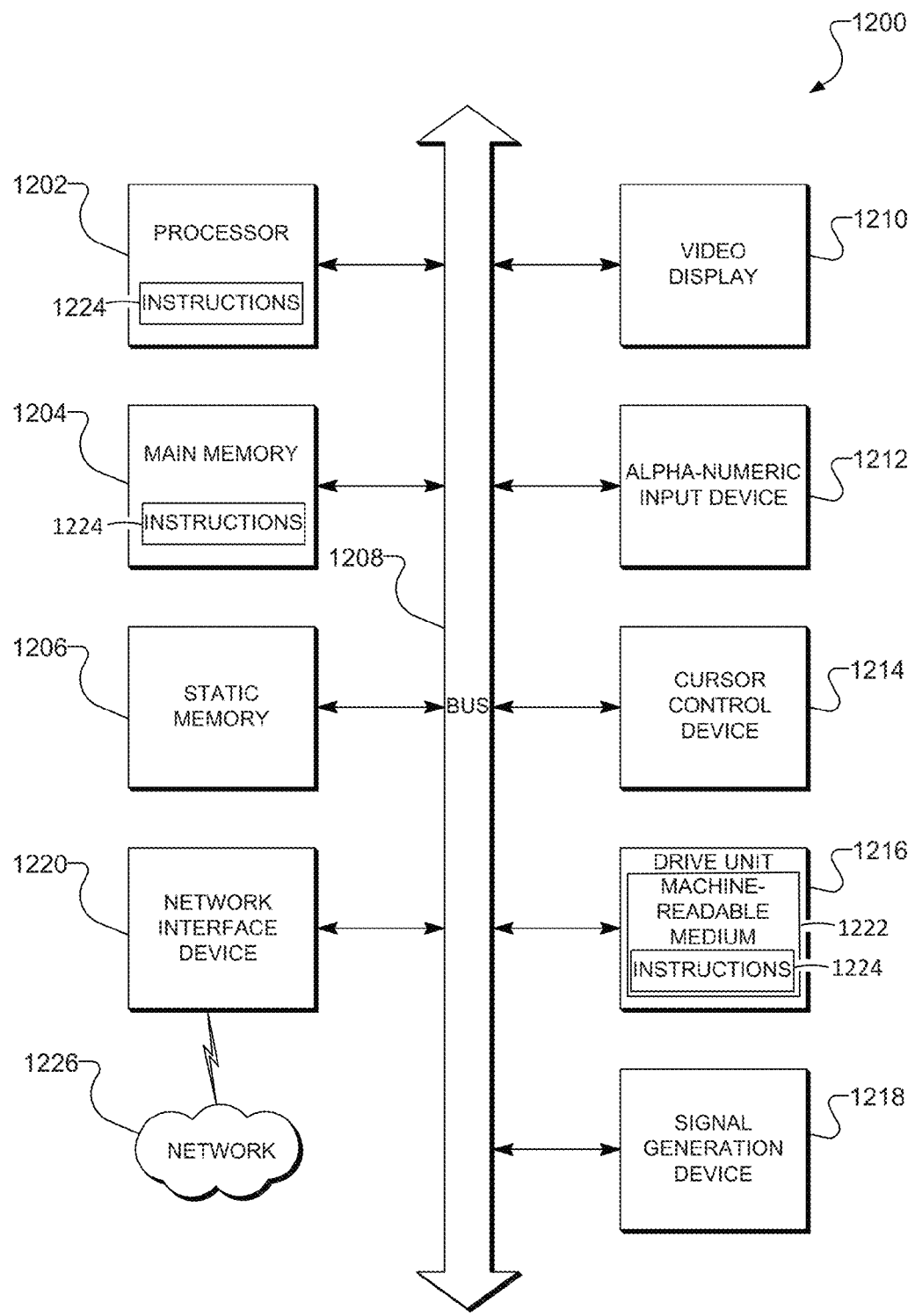
FIG. 12 shows a diagrammatic representation of a machine in the example form of a computer system within which a set of instructions may be executed to cause the machine to perform any one or more of the methodologies discussed herein, in accordance with some embodiments.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    at least one processor; and
    a non-transitory computer-readable medium storing executable instructions that, in response to being executed, cause the system to perform operations comprising:
        receiving, by a search engine of a first website, input via a user interface of a device accessing the first website, wherein the received input comprises a search query;
        determining item listing information of an item listed for sale on a second website based on the received input, the second website being different from the first website;
        causing the item listing information to be displayed on the first website on the device via the user interface; and
        enabling, using at least one remote application programming interface (API), the device to interact with the second website without navigating to the second website, via the user interface and the first website, regarding the item listed for sale on the second website by interacting with the item listing information being displayed on the first website to reduce an amount of navigation between websites that is performed by the user regarding the item listed for sale, the enabling the device to interact with the second website regarding the item listed for sale comprising enabling the device to complete at least one transaction-based function for the item listed for sale using at least one functionally-active graphical user interface element displayed on the first website and without navigating to the second website, the at least one transaction-based function comprising attempting to purchase the item listed for sale.

2. The system of claim 1, wherein attempting to purchase the item listed for sale comprises at least one of submitting a request to purchase the item listed for sale and submitting a request to bid on the item listed for sale.

3. The system of claim 1, wherein the operations further comprise:
    determining content based on the received input, the determined content being different from the item listing information and different from any content on the second website, wherein the causing the item listing information to be displayed on the first website comprises causing the determined content and the item listing information to be displayed concurrently on the first website on the device.

4. The system of claim 3, wherein determining the content comprises determining, by the search engine of the first website, at least one search result based on the search query.

5. The system of claim 4, wherein the search engine is a general purpose search engine, and the at least one search result comprises at least one general purpose search result that is based on a search of multiple websites other than the first website.

6. The system of claim 5, wherein the at least one general purpose search result is based on a search of all searchable websites on the World Wide Web.

7. A computer-implemented method comprising:
    receiving, by a search engine of a first website, input via a user interface of a device accessing the first website, wherein the received input comprises a search query;
    determining item listing information of an item listed for sale on a second website based on the received input, the second website being different from the first website;
    causing the item listing information to be displayed on the first website on the device via the user interface; and
    enabling, by at least one processor using at least one remote application programming interface (API), the device to interact with the second website without navigating to the second website, via the user interface and the first website, regarding the item listed for sale on the second website by interacting with the item listing information being displayed on the first website to reduce an amount of navigation between websites that is performed by the user regarding the item listed for sale, the enabling the device to interact with the second website regarding the item listed for sale comprising enabling the device to complete at least one transaction-based function for the item listed for sale using at least one functionally-active graphical user interface element displayed on the first website and without navigating to the second website, the at least one transaction-based function comprising attempting to purchase the item listed for sale.

8. The computer-implemented method of claim 7, wherein attempting to purchase the item listed for sale comprises at least one of submitting a request to purchase the item listed for sale and submitting a request to bid on the item listed for sale.

9. The computer-implemented method of claim 8, wherein the operations further comprise:
   determining content based on the received input, the determined content being different from the item listing information and different from any content on the second website, wherein the causing the item listing information to be displayed on the first website comprises causing the determined content and the item listing information to be displayed concurrently on the first website on the device.

10. The computer-implemented method of claim 9, wherein determining the content comprises determining, by the search engine of the first website, at least one search result based on the search query.

11. The computer-implemented method of claim 10, wherein the search engine is a general purpose search engine, and the at least one search result comprises at least one general purpose search result that is based on a search of multiple websites other than the first website.

12. The computer-implemented method of claim 11, wherein the at least one general purpose search result is based on a search of all searchable websites on the World Wide Web.

13. A non-transitory machine-readable storage medium storing a set of instructions that, in response to being executed by at least one processor, cause a system to perform a set of operations comprising:
   receiving, by a search engine of a first website, input via a user interface of a device accessing the first website, wherein the received input comprises a search query;
   determining item listing information of an item listed for sale on a second website based on the received input, the second website being different from the first website;
   causing the item listing information to be displayed on the first website on the device via the user interface; and
   enabling, using at least one remote application programming interface (API), the device to interact with the second website without navigating to the second website, via the user interface and the first website, regarding the item listed for sale on the second website by interacting with the item listing information being displayed on the first website to reduce an amount of navigation between websites that is performed by the user regarding the item listed for sale, the enabling the device to interact with the second website regarding the item listed for sale comprising enabling the device to complete at least one transaction-based function for the item listed for sale using at least one functionally-active graphical user interface element displayed on the first website and without navigating to the second website, the at least one transaction-based function comprising attempting to purchase the item listed for sale.

14. The non-transitory machine-readable storage medium of claim 13, wherein attempting to purchase the item listed for sale comprises at least one of submitting a request to purchase the item listed for sale and submitting a request to bid on the item listed for sale.

15. The non-transitory machine-readable storage medium of claim 13, wherein the operations further comprise:
   determining content based on the received input, the determined content being different from the item listing information and different from any content on the second website, wherein the causing the item listing information to be displayed on the first website comprises causing the determined content and the item listing information to be displayed concurrently on the first website on the device.

16. The non-transitory machine-readable storage medium of claim 15, wherein determining the content comprises determining, by the search engine of the first website, at least one search result based on the search query.

* * * * *